3,324,373
ACCELERATION AND BRAKING CONTROL SYSTEM FOR ELECTRIC MOTORS
John J. Stamm, Export, Pa., assignor to Westinghouse Electric Corporation, Pittsburgh, Pa., a corporation of Pennsylvania
Filed Aug. 30, 1963, Ser. No. 305,799
4 Claims. (Cl. 318—274)

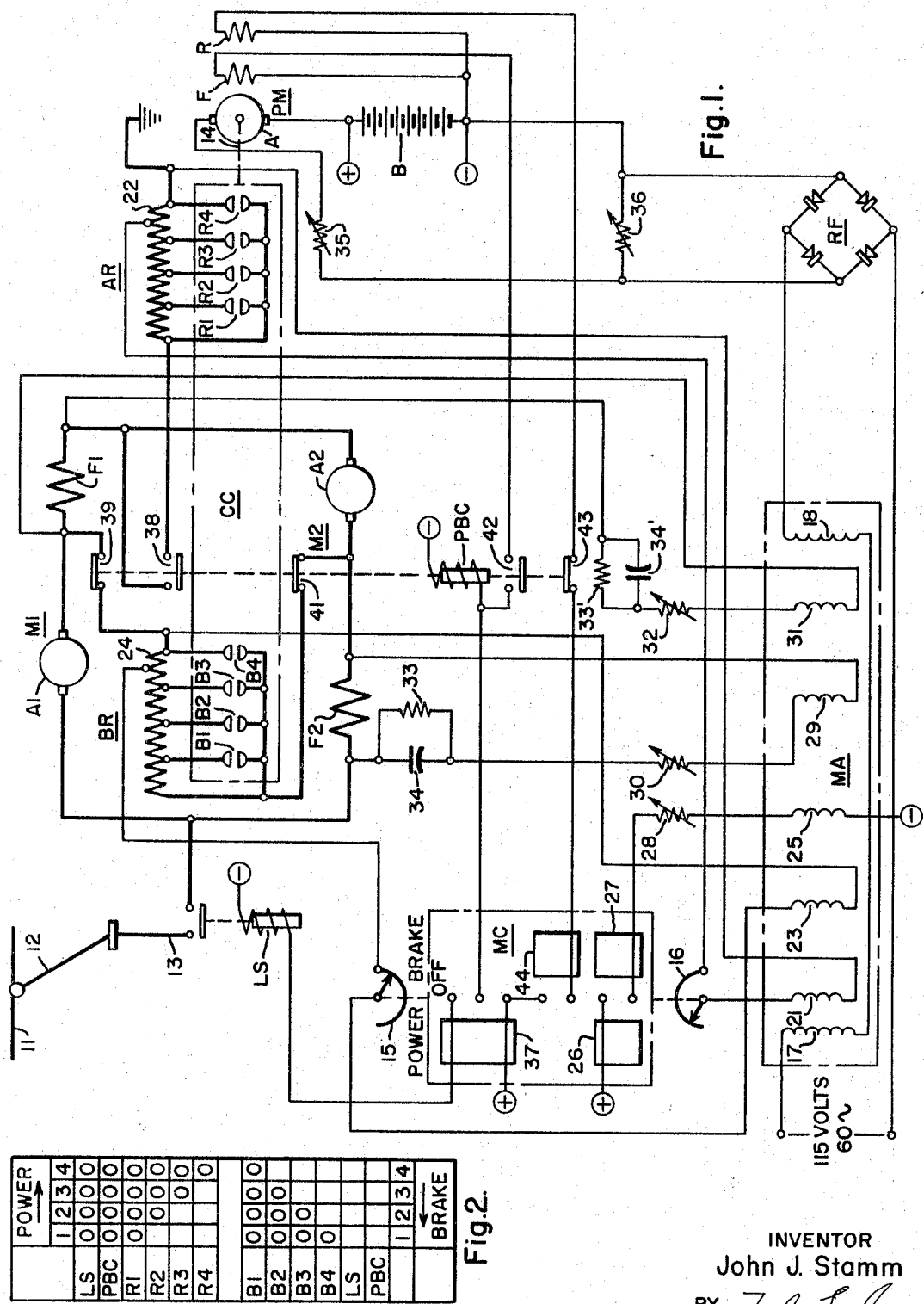
June 6, 1967   J. J. STAMM   3,324,373
ACCELERATION AND BRAKING CONTROL SYSTEM FOR ELECTRIC MOTORS
Filed Aug. 30, 1963
INVENTOR
John J. Stamm
ATTORNEY United States Patent Office 3,324,373
Patented June 6, 1967

This invention relates, generally, to motor control systems and, more particularly, to systems for controlling the operation of electric motors which are utilized for propelling vehicles, such as rapid transit cars.

In order to accelerate relatively large direct current series motors from standstill to maximum speed when the power supply voltage is fixed, resistance starting with multiple steps is usually utilized. Heretofore, to obtain smooth, even acceleration, and electric braking, current responsive relays with a small differential between pick-up and drop-out have been used to control the operation of sequence switches, air or motor driven cam controllers, or other resistor shunting mechanisms. Since these relays have moving parts, careful maintenance is necessary in order to obtain consistent and trouble free operation.

An object of this invention is to utilize a static device for controlling the operation of a resistor shunting mechanism, such as a cam controller or an accelerator, driven by a pilot motor.

A more specific object of the invention is to control the operation of the pilot motor during both acceleration and dynamic braking of a vehicle propelled by main traction motors.

Another object of the invention is to control the operation of the pilot motor by means of a single static device, such as a magnetic amplifier.

A further object of the invention is to provide for instantly starting, stopping and reversing a pilot motor controlled by a magnetic amplifier.

Still another object of the invention is to provide for varying the rates of acceleration and braking of an electric vehicle having a resistor-shunting mechanism which is controlled by a static device.

Other objects of the invention will be explained fully hereinafter or will be apparent to those skilled in the art.

In accordance with one embodiment of the invention, the variable output of a magnetic amplifier is utilized to operate a pilot motor which drives a cam controller for shunting resistance step-by-step from the circuit of the traction motors of an electrically propelled vehicle. The cam controller operates in one direction during acceleration and in the opposite direction during dynamic braking of the traction motors. The magnetic amplifier is connected to the pilot motor in series with a battery. The maximum output voltage of the amplifier minus the EMF of the battery is sufficient to operate the pilot motor at maximum speed. The output of the magnetic amplifier is determined by a bias winding energized by the battery and by control windings energized by currents proportional to the traction motor current which is determined by the resistance in the traction motor circuit. If the traction motor current exceeds the setting of the magnetic amplifier, the pilot motor is reversed to insert resistance in the traction motor circuit.

For a better understanding of the nature and objects of the invention, reference may be had to the following detailed description, taken in conjunction with the accompanying drawing, in which:

FIGURE 1 is a diagrammatic view of a control system embodying the principal features of the invention; and FIG. 2 is a chart showing the sequence of operation of switch members of the cam controller during acceleration and braking.

Referring to the drawing, and particularly to FIGURE 1, the system shown therein comprises two traction motors M1 and M2, a line switch LS, a braking resistor BR, an accelerating resistor AR, a cam controller CC, a pilot motor PM for operating the cam controller CC, a master controller MC, a power-brake control switch PBC, a magnetic amplifier MA, a rectifier RF, a number of resistors, and a capacitor which will be mentioned hereinafter.

The motors M1 and M2 are preferably of the direct-current series type suitable for propelling a vehicle, such as a rapid transit car (not shown). The motor M1 has an armature A1 and a series field winding F1. Likewise, the motor M2 has an armature A2 and a series field winding F2. The series field windings may be connected through reversing switches, in the usual manner, to permit reversing the motors. As shown, the motors are connected in parallel-circuit relation. It will be understood that during acceleration the motors could be first connected in series-circuit relation and then in parallel-circuit relation, if desired, in a manner well known in the art.

It will also be understood that additional motors, similar to the motors M1 and M2, could be provided if desired. The line switch LS is provided for connecting the motors to a third rail or trolley conductor 11 through a current collector 12 and a power conductor 13.

The power-brake control switch PBC is provided for connecting the motors to the accelerating resistor AR during acceleration of the motors. When the switch PBC is in the deenergized position it establishes dynamic braking connections for the motors and connects the braking resistor BR in the dynamic braking circuit. During dynamic braking, the field winding F2 is connected in series-circuit relation with the armature winding A1, and the field winding F1 is connected in series-circuit relation with the armature winding A2. Braking resistor BR is connected in a circuit which is common to both of the motor braking circuits.

The cam controller CC is provided for shunting the accelerating resistor AR from the motor circuit step-by-step during acceleration of the motors, by cam actuation of a series of contacts, and for similarly shunting the braking resistor BR from the motor circuit during dynamic braking of the motors. It will be understood that the controller CC may be of the drum type instead of the cam type, or it may be of a type known as an accelerator in which a roller actuates a plurality of fingers in sequential relation to shunt a resistor from the motor circuit. These types of controllers are well known in the art and any of them may be used.

The pilot motor PM has an armature A, and two field windings F and R. When the field winding F is energized the motor drives the cam controller CC in one direction, and when the field winding R is energized the cam controller is driven in the opposite direction. The motor is connected to the cam controller by means of a shaft 14.

The master controller MC may be of a drum type well known in the art. When the controller is actuated in one direction, circuits are established to apply power to the traction motors to accelerate the vehicle. When the controller is actuated in the other direction dynamic braking circuits for the traction motors are established to decelerate the vehicle. Two rheostats 15 and 16 are actuated by the controller MC for a purpose which will be explained hereinafter.

In order to simplify the drawings and the description, protective interlocks and limit switches which are usually provided in a system of the present type have been omitted. The system has been shown in a much simplified form for the purpose of illustration and is to be taken as representing any traction motor control system of the same general type. It will be understood that the invention is generally applicable to a control system having a resistance-shunting controller of a type which has heretofore been controlled by an electro-mechanical limit relay.

The magnetic amplifier MA has two load windings 17 and 18 which may be energized from a suitable alternating current source as indicated on the drawing. The amplifier is provided with a control winding 21 which is connected across a section 22 of the accelerating resistor AR in series with a rheostat 16 which, as previously explained, is actuated by the controller MC. The magnetic amplifier also has a control winding 23 which is connected across a section 24 of the braking resistor BR in series with the rheostat 15 which is also actuated by the controller MC.

As shown, a bias winding 25 on the amplifier MA is energized from a battery B through either a contact segment 26 or a contact segment 27 on the controller MC. A variable resistor 28 is connected in the circuit of the winding 25 to adjust the current permitted to flow through the winding. A control winding 29 on the amplifier is connected across the field winding F2 in series with a capacitor 34, which may be shunted by a resistor 33, and a variable resistor 30. Another control winding 31 on the amplifier is connected across the field winding F1 in series with a variable resistor 32, and with a capacitor 34' which may be shunted by a resistor 33'.

The output of the magnetic amplifier MA is rectified by the rectifier RF which is connected to the armature A of the pilot motor PM in series-circuit relation with the battery B and a variable resistor 35. A variable resistor 36 is connected across the output terminals of the rectifier RF. The maximum output potential of the magnetic amplifier is such that the difference between the output potential of the rectifier RF which is not absorbed by the resistors 35 and 36 and the potential of the battery B is sufficient to operate the pilot motor PM at maximum speed. Thus, the resistors 35 and 36 may be adjusted to obtain the maximum desired speed of the motor PM when the output potential of the amplifier is at its maximum.

In order that the functioning of the apparatus may be more clearly understood, the operation of the system will now be described in more detail. Assuming that it is desired to accelerate the vehicle, the master controller MC is actuated to the "power" position. When the controller MC is in the "power" position, the actuating coil of the line switch LS is energized through a contact segment 37 to close this switch, thereby connecting the motors M1 and M2 to the power source.

The actuating coil of the switch PBC is also energized at this time, thereby closing main contact member 38 of this switch and opening main contact members 39 and 41. Auxiliary contact member 42 is closed at this time to energize field winding F of the pilot motor PM, and auxiliary contact member 43 is opened. The motors M1 and M2 are connected in parallel-circuit relation by means of the contact member 38 and they are connected to the power source in series with the accelerating resistor AR.

When the traction motors are connected across the fixed supply voltage, the amount of current which flows through the motors depends upon the amount of resistance inserted in the motor circuit. At the same time, the pilot motor PM receives full voltage since the initial inrush of current is below the established current setting of the magnetic amplifier MA, as determined by the current in the bias winding 25, and the cam controller advances at full speed. Resistor sections are shorted by the successive closing of one or more of the resistor shunting switches R1 to R4, and the motor current increases until a value of current is reached which corresponds to the setting of the magnetic amplifier. At this point, the current flowing in the control winding 21 which, as previously explained, is connected across a section of the accelerating resistor AR, reaches a value which causes the magnetic amplifier output to drop to the level of the battery voltage. The pilot motor PM stops, since the available electromotive force for operating the pilot motor has dropped to zero.

If for any reason the motor operated cam controller has progressed too far, exceeding the desired current limit, the amplifier output will be further reduced towards zero, in which case the battery voltage will exceed the magnetic amplifier output and operate the pilot motor to drive the cam controller in the reverse direction until the traction motor current has dropped to the desired level. In this manner, it is possible to maintain a constant accelerating current.

Also, it is possible to change the accelerating rate by operating the master controller MC to actuate the rheostat 16 to vary the current permitted to flow in the control winding 21. The cam controller is advanced in this way under the control of the magnetic amplifier until all of the accelerating resistor AR is cut out of the motor circuit. The cam controller is held in this position by the pilot motor PM which may be of the torque motor type. When the controller is returned to the "off" position, a low rate dynamic braking circuit is established. If it is desired to decelerate the vehicle by means of dynamic braking, the master controller MC is operated to the "brake" position. When the controller MC is in the "brake" position the line switch LS and the switch PBC are de-energized. Thus, the contact members of the line switch are opened to disconnect the traction motors from the power source, and the main contact members 39 and 41 of the switch PBC are closed to establish dynamic braking circuits for the motors. Auxiliary contact member 42 is opened to deenergize the field winding F and auxiliary contact member 43 is closed to energize field winding R of the pilot motor through a contact segment 44 on the controller MC. Thus, the pilot motor will operate to drive the cam controller in the opposite direction from that during acceleration. The braking resistor BR is shunted from the motor circuit step-by-step by closing the contacts B1 to B4 in sequential relation. When the braking current exceeds a predetermined value, as determined by the current flowing in the control winding 23 on the magnetic amplifier which is connected across a section of the resistor BR, the progression of the cam controller is stopped in the manner hereinbefore described.

The braking rate may be changed by operating the controller MC to actuate the rheostat 15 which is in series with the control winding 23. Progression of the cam controller continues until all of the braking resistor BR is shunted from the motor circuit.

The magnetic amplifier is also provided with a rate of rise feature which permits controlled action of the pilot motor as a function of the rate of motor current rise or fall. As previously explained, the control winding 29 of the amplifier is connected across the field winding F2 and the control winding 31 is connected across the field winding F1. During either braking or acceleration, if for any reason the rate of current build up is delayed, the cam controller will operate at its highest speed to cut out resistors. This results in a sudden voltage build up on the motors M1 and M2 with corresponding high current inrush. The rate of rise feature of the control prevents excessive motor current under these conditions. Under normal steady state conditions or when the motor current in changing relatively slowly, no current or only a negligibly small current flows in the control windings 29 and 31. With a rapidly changing motor current, however, and correspondingly changing voltage across the field windings F1 and F2, the capacitors 34 and 34' permit current to flow in the control windings 29 and 31. The windings 29 and 31 are cumulative with the windings 21 and 23 and the output of the magnetic amplifier is thus reduced to reduce the speed of the motor PM. The currents in the windings 29 and 31 are proportional to the rate of change of the motor current, and with high rates of change the magnetic amplifier output is sufficiently reduced to reverse the motor PM so that the cam controller reinserts resistance momentarily to rapidly reduce the motor current to the desired limit. When normal conditions are reestablished in this way, the current in the windings 29 and 31 drops to substantially zero to permit normal operation to resume as described above. Any charge remaining on the capacitors 34 and 34' is dissipated in the shunting resistors 33 and 33'.

From the foregoing description it is apparent that the static control system herein described will permit the instantaneous change of the acceleration or braking rate at the command of the car operator with a minimum lag in response time and with the use of only one magnetic amplifier unit which cooperates with a battery or other source of direct current potential to control the operation of the pilot motor which drives the resistor shunting controller. Since only one magnetic amplifier is required the system is simplified. The system is suitable for controlling the operation of any motor driven resistance shunting controller or accelerator.

Since numerous changes may be made in the above-described construction, and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a control system for an electric traction motor, means for connecting the motor and an accelerating resistor to a power source to accelerate the motor, means for establishing a circuit for dynamic braking of the motor, said dynamic braking circuit including a braking resistor connected to carry the motor current, control means for progressively varying said accelerating resistor during acceleration of the motor and for progressively varying said braking resistor during dynamic braking, a reversible pilot motor for operating said control means, magnetic amplifier means providing a direct current output, a source of constant direct current potential, the output of the magnetic amplifier means and the direct current source being connected in opposition to energize said pilot motor, and the magnetic amplifier means including control winding means energized proportionally to the motor current during acceleration and during braking for controlling the output voltage of the magnetic amplifier means in response to the motor current.

2. A control system as defined in claim 1 in which the magnetic amplifier means also includes adjustable bias means for determining the value of motor current at which the magnetic amplifier output voltage is equal to the voltage of the direct current source.

3. In a control system for an electric traction motor, means for connecting the motor to a power source to accelerate the motor, means for establishing connections for dynamic braking of the motor, resistance means for controlling the motor current, control means for progressively varying said resistance means during acceleration and during braking, a reversible pilot motor for operating said control means, magnetic amplifier means providing a direct current output, a source of constant direct current potential, the output of the magnetic amplifier means and the direct current source being connected in opposition to energize said pilot motor, and the magnetic amplifier means including first control winding means energized in response to the motor current for controlling the output voltage of the magnetic amplifier means and second control winding means energised in response to the rate of change of the motor current for controlling the output voltage of the magnetic amplifier means.

4. A control system as defined in claim 3 in which the magnetic amplifier means also includes adjustable bias winding means for determining the value of motor current at which the output voltage of the magnetic amplifier means is equal to the voltage of the direct current source.

References Cited

UNITED STATES PATENTS

| | | | |
|---|---|---|---|
| 2,398,007 | 4/1946 | Hunter | 318—421 X |
| 2,561,782 | 7/1951 | Bunyan | 318—274 |
| 2,757,328 | 7/1956 | Willby | 318—274 |
| 2,892,974 | 6/1959 | Moore | 318—270 X |
| 3,189,196 | 6/1965 | Carl | 318—327 X |
| 3,218,536 | 11/1965 | Zollinger | 318—382 X |
| 3,218,537 | 11/1965 | Stamm | 318—380 X |

ORIS L. RADER, *Primary Examiner.*

J. C. BERENZWEIG, J. J. BAKER,
*Assistant Examiners.*